(12) United States Patent
Naruse et al.

(10) Patent No.: US 12,459,309 B2
(45) Date of Patent: Nov. 4, 2025

(54) PNEUMATIC TIRE

(71) Applicant: The Yokohama Rubber Co., LTD., Tokyo (JP)

(72) Inventors: Masahiro Naruse, Hiratsuka (JP); Jun Matsuda, Hiratsuka (JP); Takashi Hoshiba, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 399 days.

(21) Appl. No.: 17/262,660

(22) PCT Filed: Jul. 17, 2019

(86) PCT No.: PCT/JP2019/028152
§ 371 (c)(1),
(2) Date: Jan. 22, 2021

(87) PCT Pub. No.: WO2020/022158
PCT Pub. Date: Jan. 30, 2020

(65) Prior Publication Data
US 2021/0300126 A1 Sep. 30, 2021

(30) Foreign Application Priority Data
Jul. 24, 2018 (JP) .................................. 2018-138614

(51) Int. Cl.
*B60C 19/00* (2006.01)
*B60C 11/24* (2006.01)
(Continued)

(52) U.S. Cl.
CPC .......... *B60C 19/002* (2013.01); *B60C 11/243* (2013.01); *B60C 19/003* (2013.01); *B60C 23/0493* (2013.01); *B60C 2019/004* (2013.01)

(58) Field of Classification Search
CPC ................ B60C 19/002; B60C 19/003; B60C 2019/004
See application file for complete search history.

(56) References Cited

U.S. PATENT DOCUMENTS

| | | | | | |
|---|---|---|---|---|---|
| 3,905,823 | A | * | 9/1975 | Piskoti | .................... B29C 33/64 |
| | | | | | 106/287.15 |
| 2005/0205183 | A1 | * | 9/2005 | Yukawa | ................ B60C 19/002 |
| | | | | | 152/157 |

(Continued)

FOREIGN PATENT DOCUMENTS

| CN | 101588930 A | 11/2009 |
|---|---|---|
| DE | 102015217474 A1 | 3/2017 |

(Continued)

OTHER PUBLICATIONS

Machine Translation: KR19990068976A, N/A, (Year: 2023).*

(Continued)

*Primary Examiner* — Kendra Ly
(74) *Attorney, Agent, or Firm* — Thorpe North & Western

(57) ABSTRACT

A pneumatic tire includes a sound absorbing member having a band shape. The sound absorbing member is bonded to an inner surface of a tread portion along a tire circumferential direction. The sound absorbing member includes a missing portion at at least one location in the tire circumferential direction. The at least one missing portion is disposed in a range corresponding to a light point in a tire main body. A correction body for correcting weight unbalance is fixed to a tire inner surface in the missing portion within the range corresponding to the light point.

13 Claims, 6 Drawing Sheets

(51) Int. Cl.
*B60C 23/00* (2006.01)
*B60C 23/04* (2006.01)

(56) References Cited

U.S. PATENT DOCUMENTS

| | | | |
|---|---|---|---|
| 2005/0274448 A1* | 12/2005 | Lettieri | B24B 5/366 |
| | | | 134/1 |
| 2006/0090835 A1* | 5/2006 | Mancosu | B60C 23/0493 |
| | | | 156/110.1 |
| 2006/0272759 A1 | 12/2006 | Yukawa | |
| 2009/0090446 A1 | 4/2009 | Ikeda et al. | |
| 2009/0308519 A1 | 12/2009 | Ishihara | |
| 2011/0056612 A1* | 3/2011 | Sugimoto | C08L 53/00 |
| | | | 156/110.1 |
| 2012/0073717 A1 | 3/2012 | Agostini et al. | |
| 2015/0191053 A1 | 7/2015 | Shouyama | |
| 2015/0328942 A1 | 11/2015 | Weston | |
| 2016/0288587 A1* | 10/2016 | Tanno | B60C 11/00 |
| 2017/0066294 A1* | 3/2017 | Nagaya | B60C 23/0493 |
| 2017/0305208 A1 | 10/2017 | Kon et al. | |
| 2018/0134103 A1* | 5/2018 | Bruneau | G06K 19/07764 |
| 2020/0094503 A1 | 3/2020 | Boscaino et al. | |
| 2021/0039451 A1* | 2/2021 | Soini | B60C 23/0488 |

FOREIGN PATENT DOCUMENTS

| | | | |
|---|---|---|---|
| JP | 2004314895 A | * | 11/2004 |
| JP | 2005-205937 | | 8/2005 |
| JP | 2006-335199 | | 12/2006 |
| JP | 2007-237962 | | 9/2007 |
| JP | 2007-331295 | | 12/2007 |
| JP | 2012-071601 | | 4/2012 |
| JP | 2014-169060 | | 9/2014 |
| JP | 2015116689 A | * | 6/2015 |
| JP | 2016-505438 | | 2/2016 |
| JP | 2016-060258 A | | 4/2016 |
| JP | 6272225 | | 1/2018 |
| JP | 2018-024352 | | 2/2018 |
| JP | 2018-065494 | | 4/2018 |
| KR | 19990068976 A | * | 9/1999 |
| WO | WO 2007/102279 | | 9/2007 |
| WO | WO 2014/010728 | | 1/2014 |
| WO | WO 2014/081409 | | 5/2014 |
| WO | WO 2015/076381 | | 5/2015 |
| WO | WO 2018/030535 | | 2/2018 |
| WO | WO 2018/116209 A1 | | 6/2018 |

OTHER PUBLICATIONS

Machine Translation: JP-2015116689-A, Sakakibara K, (Year: 2023).*
Machine Translation: JP-2004314895-A, Ikebayashi H, (Year: 2023).*
International Search Report for International Application No. PCT/JP2019/028152 dated Sep. 10, 2019, 4 pages, Japan.

* cited by examiner

PNEUMATIC TIRE

TECHNICAL FIELD

The present technology relates to a pneumatic tire with a sound absorbing member bonded to a tire inner surface and particularly relates to a pneumatic tire in which a correction body to correct weight unbalance is disposed to ensure reducing degradation of the balance of the tire.

BACKGROUND ART

A sensor unit including a sensor for acquiring tire internal information, such as an internal pressure and a temperature, has been installed in a tire cavity (for example, see Japan Patent No. 6272225 and Japan Unexamined Patent Publication No. 2016-505438). However, when the sensor unit is installed to a pneumatic tire in which a sound absorbing member having a band-like shape is bonded to a tire inner surface, there are problems that an installation position of the sensor unit is limited and the balance of the tire is degraded depending on the installation position of the sensor unit.

SUMMARY

The present technology provides a pneumatic tire that ensures suppressing degradation of the balance of the tire by disposing a correction body to correct weight unbalance.

A pneumatic tire includes a sound absorbing member having a band-like shape. The sound absorbing member is bonded to an inner surface of a tread portion along a tire circumferential direction. The sound absorbing member includes a missing portion at at least one location in the tire circumferential direction. The at least one missing portion is disposed in a range corresponding to a light point in a tire main body. A correction body for correcting weight unbalance is fixed to a tire inner surface in the missing portion within the range corresponding to the light point.

In an embodiment of the present technology, the sound absorbing member having the band-like shape is bonded to the inner surface of the tread portion along the tire circumferential direction, the sound absorbing member includes the missing portion at at least one location in the tire circumferential direction, and the at least one missing portion is disposed in the range corresponding to the light point in the tire main body. Accordingly, a weight on the tire circumference is relatively light in the range corresponding to the light point. In contrast, the correction body that corrects the weight unbalance is fixed to the tire inner surface in the missing portion within the range corresponding to the light point of the tire main body. In other words, since the correction body is added to the position where the weight is relatively light on the tire circumference, the weight unbalance possessed by the tire main body and the weight unbalance caused by the sound absorbing member are counteracted by the weight of the correction body, so the degradation of the balance of the tire can be suppressed.

The embodiment of the present technology is preferably as follows. A virtual weight Ws of the missing portion, a weight Wu of the correction body, and a static balance weight SB of the tire satisfy a relationship $0.5 \leq Wu/(Ws+SB) \leq 1.5$. As a result, the degradation of the balance of the tire can be effectively suppressed.

The embodiment of the present technology is preferably as follows. A circumferential length of the missing portion is in a range of from 5% to 20% to a tire inner circumferential length. As a result, the durability of the sound absorbing member can be improved while sufficiently obtaining an effect of reducing cavernous resonance.

The embodiment of the present technology is preferably as follows. A volume Vu of the correction body is in a range of from 0.2% to 7.0% to a virtual volume Vs of the missing portion. As a result, the degradation of the balance of the tire can be effectively suppressed.

The embodiment of the present technology is preferably as follows. A density of a weight Wu of the correction body to a virtual volume Vs of the missing portion is in a range of from $1.0 \text{ g/cm}^3$ to $4.0 \text{ g/cm}^3$. As a result, the degradation of the balance of the tire can be effectively suppressed.

The embodiment of the present technology is preferably as follows. An amount of silicon in a release agent detected in at least a fixed region of the correction body by a fluorescence X-ray analysis method is not greater than 10.0 wt. %. Alternatively, a thickness of a release agent detected in at least a fixed region of the correction body by an electron microscope is not greater than 100 μm. When a trace amount of the release agent is attached to the tire inner surface in this manner, while the release agent inhibits permeation of air from the tire inner surface and improves air retention properties, adhesiveness between the tire inner surface and the correction body can be sufficiently ensured.

The embodiment of the present technology is preferably as follows. The correction body is fixed to the tire inner surface via an adhesive layer. An adhesive strength of the adhesive layer is in a range of from $0.4 \text{ N/mm}^2$ to $100 \text{ N/mm}^2$. Accordingly, installation work of the correction body can be easily performed while the adhesive strength of the adhesive layer is successfully maintained. The adhesive strength (tensile lap-shear strength) of the adhesive layer is compliant to any of JIS (Japanese Industrial Standard)-K6850 and JIS-Z0237, and is the adhesive strength measured in a standard state (23° C., RH50%).

The embodiment of the present technology is preferably as follows. The adhesive layer is made of a cyanoacrylate-based adhesive. As a result, time for the installation work of the correction body can be shortened.

The embodiment of the present technology is preferably as follows. The correction body is disposed closer to an inner side in a tire width direction than a ground contact edge. Thus, adhesiveness between the tire inner surface and the correction body can be effectively improved. In particular, in a case where the correction body is a sensor unit including a sensor that detects an amount of wear of the tread portion, the sensor can accurately acquire tire information.

The embodiment of the present technology is preferably as follows. The correction body is directly adhered to the tire inner surface. As a result, in a case where the correction body is the sensor unit including the sensor that detects the amount of wear of the tread portion, the sensor can accurately acquire the tire information.

The embodiment of the present technology is preferably as follows. A base is inserted between the correction body and the tire inner surface. As a result, in a case where a material that can follow tire deformation is used as a material of the base, peeling of the correction body due to tire deformation can be reduced.

The embodiment of the present technology is preferably as follows. As a tire inner surface roughness in a fixed region of the correction body, an arithmetic mean height Sa is in a range of from 0.3 μm to 15.0 μm, and a maximum height Sz is in a range of from 2.5 μm to 60.0 μm. As a result, an adhesion area between the tire inner surface and the adhesive layer can be increased, and the adhesiveness between the tire inner surface and the correction body can be effectively improved. The tire inner surface roughness is measured in accordance with ISO (International Organization for Standardization) 25178. The arithmetic mean height Sa is an average of absolute values of a difference in height at respective points to an average surface of the surface, and the maximum height Sz is a distance in a height direction from the highest point to the lowest point on the surface.

The embodiment of the present technology is preferably as follows. The correction body is a sensor unit configured to acquire tire information. Such a correction body can function as the sensor unit for acquiring the tire information while functioning as the correction body for correcting the weight unbalance of the tire.

In the embodiment of the present technology, the ground contact edge is an end portion in a tire axial direction when the tire is mounted on a regular rim and inflated to a regular internal pressure, and placed vertically upon a flat surface with a regular load applied thereto. "Regular rim" is a rim defined by a standard for each tire according to a system of standards that includes standards on which tires are based, and refers to a "standard rim" in the case of JATMA (The Japan Automobile Tyre Manufacturers Association, Inc.), refers to a "design rim" in the case of TRA (The Tire and Rim Association, Inc.), and refers to a "measuring rim" in the case of ETRTO (The European Tyre and Rim Technical Organisation). In the system of standards, including standards on which tires are based, "regular internal pressure" is air pressure defined by each of the standards for each tire and is referred to as "maximum air pressure" in the case of JATMA, the maximum value being listed in the table "TIRE LOAD LIMITS AT VARIOUS COLD INFLATION PRESSURES" in the case of TRA, and is "INFLATION PRESSURE" in the case of ETRTO. However, "regular internal pressure" is 250 kPa in a case where a tire is a tire for a passenger vehicle. "Regular load" is a load defined by a standard for each tire according to a system of standards that includes standards on which tires are based, and refers to a "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. "Regular load" corresponds to 80% of the loads described above for a tire on a passenger vehicle.

DETAILED DESCRIPTION

Figure 1:
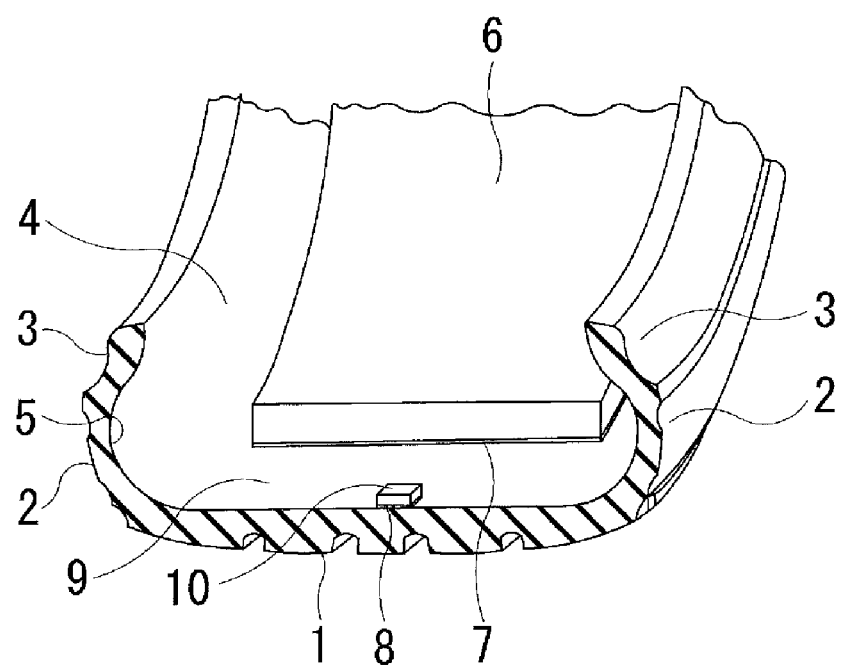
FIG. 1 is a perspective cross-sectional view of a pneumatic tire according to an embodiment of the present technology.
Figure 2:
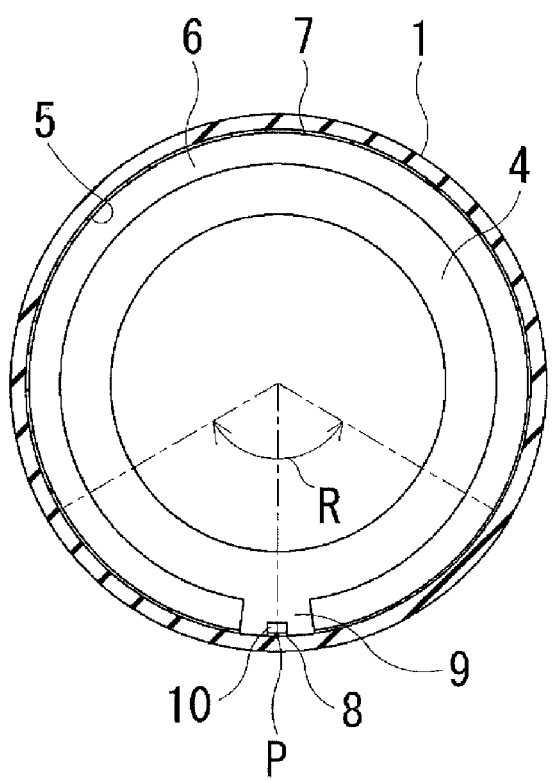
FIG. 2 is a cross-sectional view taken along an equator line of a pneumatic tire according to an embodiment of the present technology.
Figure 3:
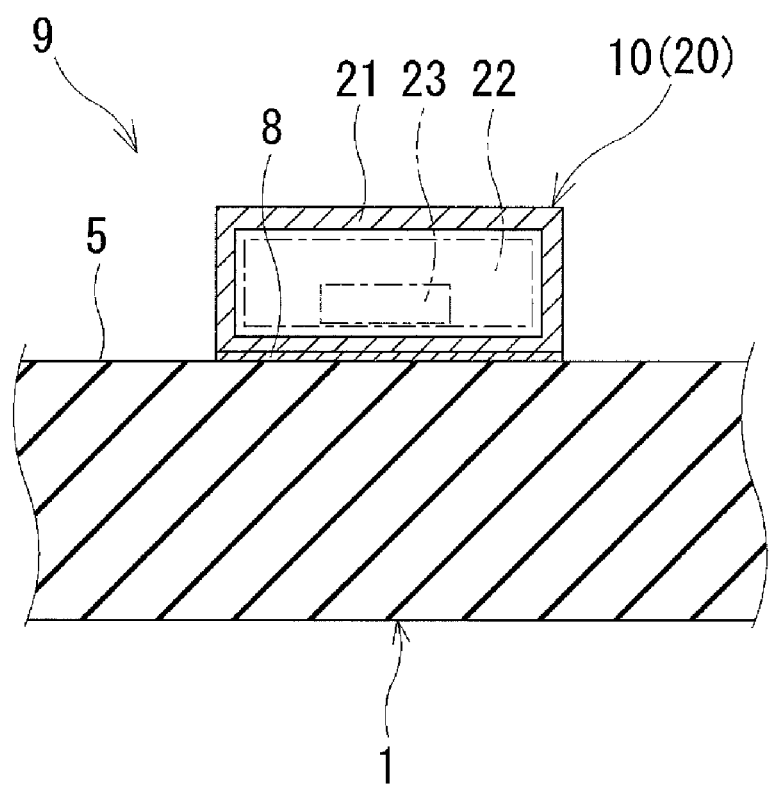
FIG. 3 is a cross-sectional view illustrating an enlarged portion of a part of the pneumatic tire according to an embodiment of the present technology.

Configurations of embodiments of the present technology will be described in detail below with reference to the accompanying drawings. FIGS. 1 to 3 illustrate a pneumatic tire according to an embodiment of the present technology. In FIG. 1, the pneumatic tire according to the present embodiment includes a tread portion 1 extending in a tire circumferential direction having an annular shape, a pair of sidewall portions 2 disposed on both sides of the tread portion 1, and a pair of bead portions 3 disposed on an inner side of the sidewall portions 2 in a tire radial direction. A sound absorbing member 6 having a band-like shape is mounted on a cavity portion 4 surrounded by the tread portion 1, the sidewall portions 2, and the bead portions 3. This sound absorbing member 6 is disposed in a region corresponding to the tread portion 1 on a tire inner surface 5.

The sound absorbing member 6 is fixed to the region corresponding to the tread portion 1 on the tire inner surface 5 along the tire circumferential direction via an adhesive layer 7. The sound absorbing member 6 is made of a porous material with open cells and has predetermined sound absorbing properties based on the porous structure. Polyurethane foam is preferably used as the porous material of the sound absorbing member 6. On the other hand, the adhesive layer 7 is not particularly limited, and, for example, an adhesive or a double-sided adhesive tape can be used as the adhesive layer 7.

The sound absorbing member 6 includes a missing portion 9 at at least one location in the tire circumferential direction. The missing portion 9 is a portion where the sound absorbing member 6 is not present on the tire circumference. The missing portion 9 is provided in the sound absorbing member 6. This allows for expansion due to inflation of the tire or shear strain of an adhering surface due to contact and rolling to be endured for a long period of time and for shear strain generated at the adhering surface of the sound absorbing member 6 to be effectively alleviated.

In the pneumatic tire, at least one missing portion 9 is disposed in a range corresponding to a light point P in a tire main body. The light point P is a position where the weight is the lightest on the circumference of the tire main body not including the sound absorbing member 6. The range corresponding to the light point P in the tire main body is a region R (see FIG. 2)±60° with respect to the light point P around the center axis of the tire main body. Preferably, the range is the region R±30° with respect to the light point P around the center axis of the tire main body. A correction body 10 for correcting the weight unbalance is fixed to the missing portion 9 within the range corresponding to the light point P. The correction body 10 and the sound absorbing member 6 are not in contact but are disposed separated from one another. An adhesive layer 8 is provided between the correction body 10 and the tire inner surface 5, and the correction body 10 is adhered to the tire inner surface 5 via the adhesive layer 8.

The adhesive layer 8 is made of a liquid adhesive or a double-sided adhesive tape. Examples of the adhesive can include a reaction curable type adhesive containing an epoxy resin or a urethane resin. In particular, since working time for installing the correction body 10 on the tire inner surface 5 is shortened, the adhesive layer 8 is preferably made of a cyanoacrylate-based adhesive (instantaneous adhesive).

The correction body 10 is not particularly limited, and it is only required that the correction body 10 have a weight to ensure correcting the weight unbalance. Examples of the correction body 10 can include a sensor unit that includes a sensor to acquire tire information and a device configured to reduce cavernous resonance by a mechanism different from the sound absorbing member 6. In particular, when the correction body 10 is the sensor unit, the correction body 10 functions as the correction body for correcting the weight unbalance of the tire and functions as the sensor unit for acquiring the tire information.

As illustrated in FIG. 3, the correction body 10 (sensor unit 20) includes a housing 21 and an electronic component 22. The housing 21 has a hollow structure and accommodates the electronic component 22 therein. The electronic component 22 includes, for example, a sensor 23 to acquire the tire information, a transmitter, a receiver, a control circuit, and a battery as appropriate. Examples of the tire information acquired by the sensor 23 can include an internal temperature and an internal pressure of the pneumatic tire and an amount of wear of the tread portion 1. For example, a temperature sensor or a pressure sensor is used to measure the internal temperature or the internal pressure. To detect the amount of wear of the tread portion 1, as the sensor 23, a piezoelectric sensor that abuts on the tire inner surface 5 can be used. The piezoelectric sensor detects an output voltage according to deformation of the tire during traveling and detects the amount of wear of the tread portion 1 based on the output voltage. Other than that, an acceleration sensor or a magnetic sensor can be used. Further, the sensor unit 20 transmits the tire information acquired by the sensor 23 to outside of the tire. Note that the internal structure of the sensor unit 20 illustrated in FIG. 3 is an example of the sensor unit and is not limited thereto.

In the pneumatic tire described above, the sound absorbing member 6 having the band-like shape is bonded to the inner surface of the tread portion 1 along the tire circumferential direction, the sound absorbing member 6 includes the missing portion 9 at at least one location in the tire circumferential direction, and at least one missing portion 9 is disposed in the range corresponding to the light point P in the tire main body. Accordingly, the weight on the tire circumference is relatively light in the range corresponding to the light point P. In contrast, the correction body 10 that corrects the weight unbalance is fixed to the tire inner surface 5 in the missing portion 9 within the range corresponding to the light point P of the tire main body. In other words, since the correction body 10 is added to the position where the weight is relatively light on the tire circumference, the weight unbalance possessed by the tire main body and the weight unbalance caused by the sound absorbing member 6 are counteracted by the weight of the correction body 10, so the degradation of the balance of the tire can be suppressed.

In FIGS. 1 to 3, the correction body 10 (sensor unit 20) is disposed closer to an inner side in a tire width direction than a ground contact edge. Thus, adhesiveness between the tire inner surface 5 and the correction body 10 can be effectively improved. In particular, in the case where the correction body 10 is the sensor unit 20 including the sensor 23 that detects the amount of wear of the tread portion 1, the sensor 23 can accurately acquire the tire information by disposing the correction body 10 closer to the inner side in the tire width direction than the ground contact edge.

Additionally, the correction body 10 (sensor unit 20) is directly adhered to the tire inner surface 5. In the case where the correction body 10 is the sensor unit 20 including the sensor 23 that detects the amount of wear of the tread portion 1, the sensor 23 can accurately acquire the tire information by directly attaching the correction body 10 to the tire inner surface 5.

In the pneumatic tire, a virtual weight Ws g of the missing portion 9, a weight Wu g of the correction body 10, and a static balance weight SB g of the tire preferably satisfy the relationship $0.5 \leq Wu/(Ws+SB) \leq 1.5$ and more preferably satisfy the relationship $0.8 \leq Wu/(Ws+SB) \leq 1.2$. By satisfying the relationship, the degradation of the balance of the tire can be effectively suppressed. Note that the virtual weight Ws of the missing portion 9 is the weight of the sound absorbing member 6 measured when assuming that the sound absorbing member 6 is present in the region where the missing portion 9 is present. When the missing portions 9 are provided at a plurality of locations on the tire circumference, the virtual weight Ws is the weight measured for the missing portion 9 in the range corresponding to the light point P.

Additionally, a circumferential length C2 mm of the missing portion 9 is preferably in the range of from 5% to 20% to a tire inner circumferential length C1 mm. By appropriately setting the circumferential length C2 of the missing portion 9 to the tire inner circumferential length C1 in this manner, the durability of the sound absorbing member 6 can be improved while sufficiently obtaining the effect of reducing cavernous resonance. Note that both of the tire inner circumferential length C1 and the circumferential length C2 of the missing portion 9 are the circumferential lengths measured on the tire inner surface 5.

Furthermore, a volume Vu cm$^3$ of the correction body 10 is preferably in the range of from 0.2% to 7.0% to a virtual volume Vs cm$^3$ of the missing portion 9. By appropriately setting the volume Vu of the correction body 10 to the virtual volume Vs of the missing portion 9 in this manner, the degradation of the balance of the tire can be effectively suppressed. Note that the virtual volume Vs of the missing portion 9 is the volume of the sound absorbing member 6 measured when assuming that the sound absorbing member 6 is present in the region where the missing portion 9 is present. When the missing portions 9 are provided at a plurality of locations on the tire circumference, the virtual volume Vs is the volume measured for the missing portion 9 in the range corresponding to the light point P.

In particular, a density of the weight Wu g of the correction body 10 to the virtual volume Vs cm$^3$ of the missing portion 9 is preferably in the range of from 1.0 g/cm$^3$ to 4.0 g/cm$^3$. By appropriately setting the density of the weight Wu of the correction body 10 in this manner, the degradation of the balance of the tire can be effectively suppressed.

In the pneumatic tire, the adhesive strength of the adhesive layer 8 is preferably in a range of from 0.4 N/mm$^2$ to 100 N/mm$^2$, and more preferably in a range of from 5.0 N/mm$^2$ to 80 N/mm$^2$. By appropriately setting the adhesive strength of the adhesive layer 8 in this manner, installation work of the correction body 10 can be easily performed while the adhesive strength of the adhesive layer 8 is successfully maintained. Here, when the adhesive strength of the adhesive layer 8 is less than 0.4 N/mm$^2$, the adhesiveness between the tire inner surface 5 and the correction body 10 is degraded, and the correction body 10 easily peels off. On the other hand, when the adhesive strength of the adhesive layer 8 is greater than 100 N/mm$^2$, a replacement work cannot be easily performed when the correction body 10 is replaced.

Furthermore, as a roughness of the tire inner surface 5 in the fixed region of the correction body 10, an arithmetic mean height Sa is preferably in a range of from 0.3 μm to 15.0 μm, and/or a maximum height Sz is preferably in a range of from 2.5 µm to 60.0 µm. In particular, more preferably, the respective arithmetic mean height Sa and maximum height Sz meet the numerical ranges described above. By appropriately setting the roughness of the tire inner surface 5 in this manner, an adhesion area between the tire inner surface 5 and the adhesive layer 8 can be increased, and the adhesiveness between the tire inner surface 5 and the correction body 10 can be effectively improved. Note that the arithmetic mean height Sa and the maximum height Sz are values measured in accordance with ISO25178, and can be measured using a commercially available surface texture measuring machine (for example, a shape analysis laser microscope or a 3D shape measuring machine). The measurement method may be any of a contact type or a non-contact type.

Figure 4:
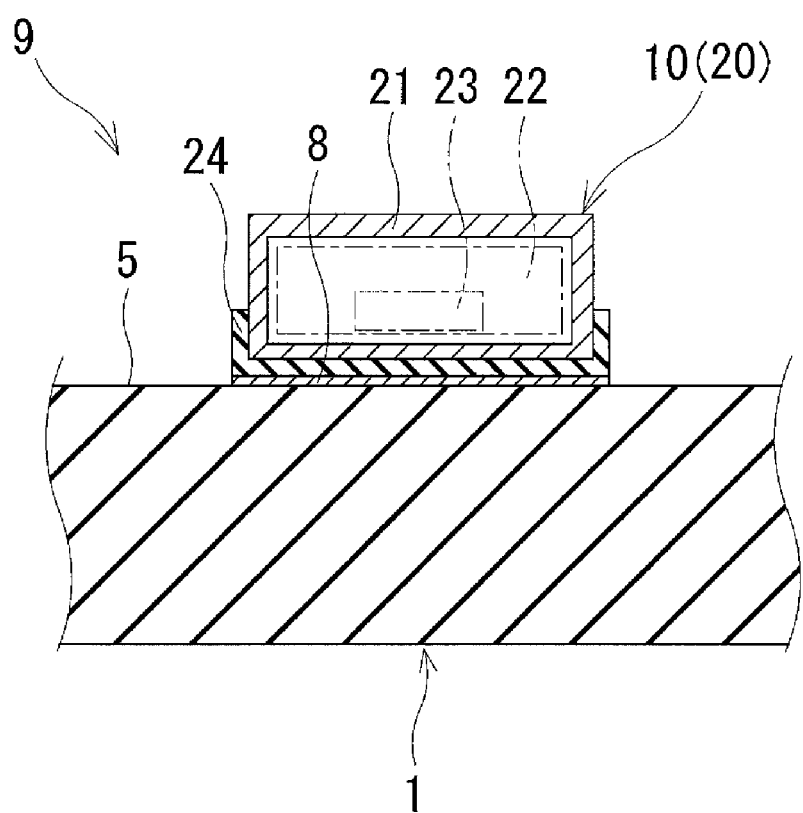
FIG. 4 is a cross-sectional view illustrating an enlarged pneumatic tire according to a modified example of an embodiment of the present technology.

FIG. 4 illustrates a pneumatic tire according to a modified example of an embodiment of the present technology. As illustrated in FIG. 4, a base 24 holding the sensor unit 20 is inserted between the correction body 10 (sensor unit 20) and the adhesive layer 8. The base 24 functions as a buffer material to reduce the peeling of the correction body 10 (sensor unit 20) due to tire deformation. Examples of the material of the base 24 can include natural rubber (NR), chloroprene rubber (Cr), butyl rubber (IIR), ethylene-propylene-diene rubber (EPDM), urethane rubber, NBR, thermoplastic elastomer, and thermosetting elastomer, and in a case where the base 24 is made of these materials, the base 24 is less likely to be damaged by tire deformation. In particular, the base 24 is preferably made of rubber having a tensile elongation at break of 80% or greater. Furthermore, the base 24 is preferably in a solid state and is more preferably in a porous state. When the base 24 is in the porous state, the base 24 has an excellent buffering effect, which is advantageous against the peeling of the correction body 10 (sensor unit 20) due to tire deformation. Because the base 24 is made of the material as described above, the base 24 can follow the tire deformation, and the peeling of the correction body 10 (the sensor unit 20) due to tire deformation can be reduced. In the embodiment illustrated in FIG. 4, an example in which the base 24 is formed to have a U shape in a cross-sectional view in the tire width direction is described, but the shape of the base 24 is not especially limited. In FIG. 4, the fixed area of the correction body 10 (sensor unit 20) corresponds to the fixed area of the base 24 where the sensor unit 20 is held.

Figure 5:
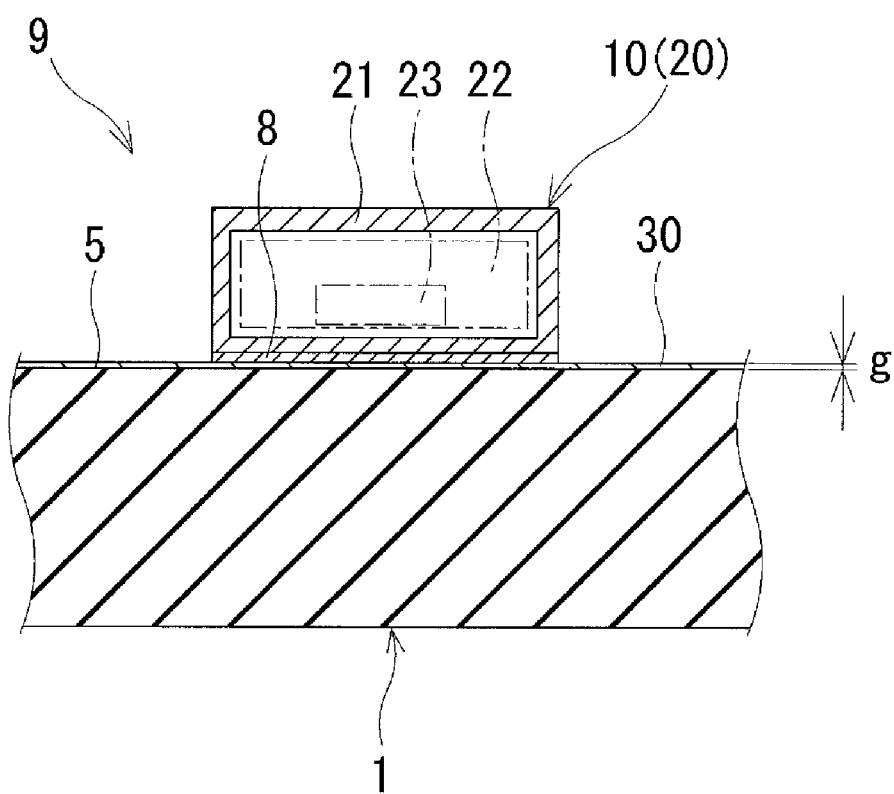
FIG. 5 is a cross-sectional view illustrating an enlarged pneumatic tire according to another modified example of an embodiment of the present technology.

FIG. 5 illustrates a pneumatic tire according to another modified example of the embodiment of the present technology. As illustrated in FIG. 5, a release agent layer 30 made of a trace amount of a release agent attached in a manufacturing process of the pneumatic tire is present between the tire inner surface 5 and the adhesive layer 8. In other words, the correction body 10 (sensor unit 20), the adhesive layer 8, and the release agent layer 30 are layered in this order from the inner side in the tire radial direction. An amount of silicon in the release agent layer 30 in at least the fixed region of the correction body 10 (sensor unit 20) on the tire inner surface 5 is preferably not greater than 10.0 wt. %, or a thickness g of the release agent layer 30 is preferably not greater than 100 µm.

To define the amount of release agent in the inner surface of the tread portion 1, an amount of silicon as the main component of a typical release agent is used as an index. The amount of silicon can be detected using a fluorescence X-ray analysis method, and in general, while the fluorescence X-ray analysis method includes a fundamental parameter method (FP method) and a calibration curve method, the present technology employs the FP method. To measure the amount of the release agent (silicon), the amount of release agent is measured using an X-ray fluorescence spectrometer at five locations in total, the center point of the fixed region of the correction body 10 (sensor unit 20), two locations on both sides in the tire circumferential direction and two locations on both sides in the tire width direction with the center point as the center. The amounts of release agents at the five locations are averaged to calculate the amount of silicon in the release agent layer 30. X-ray fluorescence particles have an intrinsic energy proportional to an atomic number, allowing an element to be identified by measuring the intrinsic energy. Specifically, the intrinsic energy of silicon is 1.74±0.05 keV. Note that the number of X-ray fluorescence particles (X-ray intensity) of the release agent (silicon) is in a range of from 0.1 cps/µA to 1.5 cps/µA.

Meanwhile, the thickness g of the release agent layer 30 can be detected using an electron microscope. To measure the thickness g of the release agent layer 30 with the electron microscope, the thickness of the release agent is measured using the electron microscope at five locations in total, the center point of the fixed region of the correction body 10 (sensor unit 20), the two locations on both sides in the tire circumferential direction and the two locations on both sides in the tire width direction with the center point as the center. The thicknesses of the release agents at the five locations are averaged to calculate the thickness g (average thickness) of the release agent layer 30.

Examples of a component that can be combined in the release agent layer 30 include one that contains a silicone component as an active ingredient. The silicone component includes organopolysiloxanes, and the examples can include dialkylpolysiloxane, alkylphenylpolysiloxane, alkyl aralkyl polysiloxane, and 3,3,3-trifluoropropylmethylpolysiloxane. The dialkylpolysiloxane is, for example, dimethylpolysiloxane, diethylpolysiloxane, methylisopropylpolysiloxane, and methyldodecylpolysiloxane. The alkylphenylpolysiloxane is, for example, methylphenylpolysiloxane, a dimethylsiloxane methylphenylsiloxane copolymer, and dimethylsiloxane-diphenylsiloxane copolymer. The alkyl aralkyl polysiloxane is, for example, methyl(phenylethyl)polysiloxane and methyl(phenylpropyl)polysiloxane. One kind or two or more kinds of these organopolysiloxanes may be used in combination.

Next, a method for manufacturing the pneumatic tire including the release agent layer 30 illustrated in FIG. 5 will be described. To vulcanize a green tire, the release agent is coated (preferably baking application) on a bladder in advance to form a coating layer made of a release agent on an outer surface of the bladder. The step of forming the coating layer on the outer surface of the bladder is performed after the application of the release agent, for example, while the release agent is stored at 150° C. for one hour, at 90° C. for four hours, or eight hours at normal temperature. Furthermore, the step of forming the coating layer on the outer surface of the bladder is performed in a range of from not less than one time to not greater than three times. The green tire is vulcanized using the bladder in which the coating layer is formed in this manner. Then, the sound absorbing member 6 is bonded to the tire inner surface 5 of the vulcanized tire via the adhesive layer 7, and the correction body 10 is fixed via the adhesive layer 8. When the vulcanization is performed using the bladder including the coating layer made of the release agent in this manner, the release agent layer 30 is formed on the tire inner surface 5 of the vulcanized pneumatic tire. Note that, in the release agent layer 30, the release agent is not transferred over the entire surface of the tire inner surface 5 but is scattered.

Instead of the vulcanization using the bladder including the coating layer made of the release agent as described above, in the vulcanization step of the green tire, the release agent may be applied to the inner surface of the green tire, vulcanization may be performed using a regular bladder, and then the tire inner surface 5 of the vulcanized tire may be irradiated with laser. Thus, the release agent attached to the tire inner surface 5 can be removed, and by adjusting an amount of irradiation of the laser, the predetermined thickness g or amount of silicon of the release agent layer 30 can be made.

The vulcanization is performed using the bladder including the coating layer made of the release agent, or the vulcanization is performed using the regular bladder and the release agent is removed by irradiating the tire inner surface 5 of the vulcanized tire with the laser to remove the release agent as described above. This allows setting the amount of silicon in the release agent detected by a fluorescence X-ray analysis method to be not greater than 10.0 wt. %, or setting the thickness of the release agent detected by the electron microscope to be not greater than 100 μm. When the trace amount of the release agent is attached to the tire inner surface 5 in this manner, while the release agent inhibits permeation of air from the tire inner surface 5 and improves air retention properties, the adhesiveness between the tire inner surface 5 and the correction body 10 can be sufficiently ensured.

In particular, in the step of forming the coating layer on the outer surface of the bladder, a coating time t (hour) and a temperature T (° C.) of the coating layer preferably meet conditions of $t \geq 0.0001T^2 - 0.07T + 9$ and $T \leq 180°$ C. In addition, more preferably, relationship formulae between the coating time t and the temperature T described above are met and also the coating time t is set within a range of from one to eight hours. Furthermore, further preferably, the temperature T is set to be 90° C. and the coating time t is set to be four hours, and the most preferably, the temperature T is set to be 150° C. and the coating time t is set to be one hour. By meeting these conditions, the time for coating the release agent can be shortened in the bladder including the coating layer, and shortening of bladder life can be reduced. Here, as the temperature T (° C.) becomes high, the coating layer can be formed in a short time. However, the bladder is likely to be deteriorated and the bladder life is shortened.

Figure 6A:
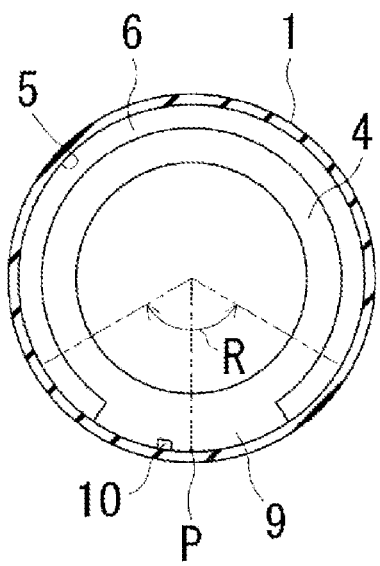
FIGS. 6A to 6D are cross-sectional views taken along an equator line illustrating respective pneumatic tires according to other modified examples of an embodiment of the present technology.
Figure 6B:
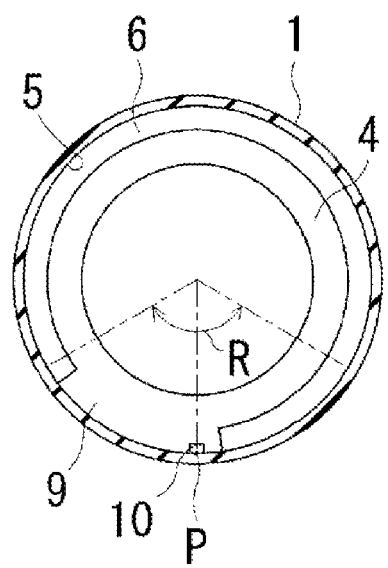
Figure 6C:
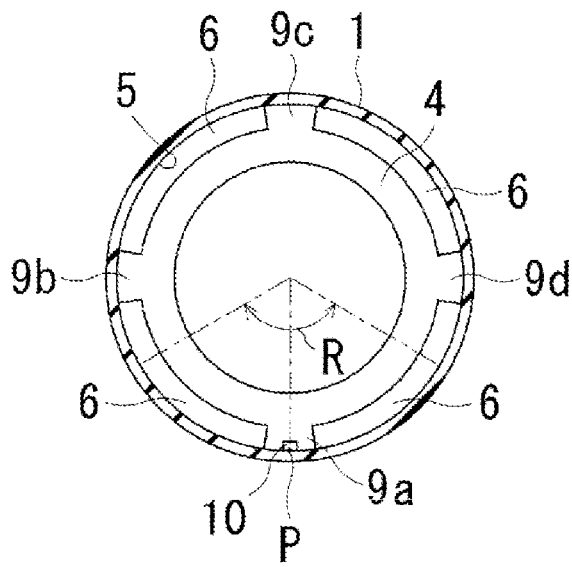
Figure 6D:
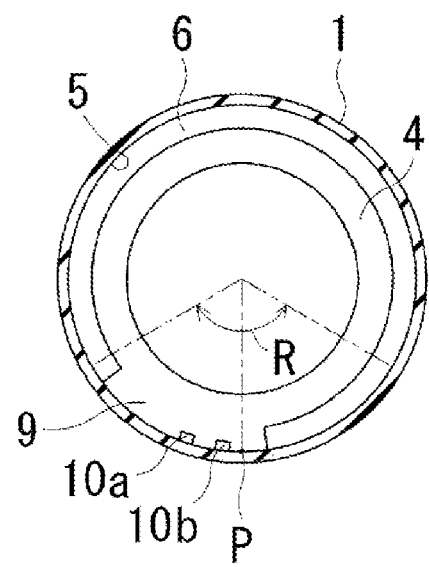

While the embodiment of FIG. 2 illustrates an example in which the missing portion 9 is provided on one location on the tire circumference, and the center in the tire circumferential direction of the missing portion 9, the center in the tire circumferential direction of the correction body 10, and the light point P are matched, the present technology is not limited to this. As other examples, as illustrated in FIG. 6A, a case where the missing portion 9 is provided on one location on the tire circumference, the center in the tire circumferential direction of the missing portion 9 and the light point P are matched, and the center in the tire circumferential direction of the correction body 10 is separated from the light point P, and as illustrated in FIG. 6B, a case where the missing portion 9 is provided on one location on the tire circumference, the center in the tire circumferential direction of the missing portion 9 is separated from the light point P, and the center in the tire circumferential direction of the correction body 10 and the light point P are matched can be illustrated. Also, as illustrated in FIG. 6C, a case where the missing portions 9 (9a to 9d) are provided on four locations on the tire circumference, the center in the tire circumferential direction of the missing portion 9a including the light point P, the center in the tire circumferential direction of the correction body 10, and the light point P are matched, and as illustrated in FIG. 6D, a case where the missing portion 9 is provided on one location on the tire circumference and a plurality of correction bodies 10a, 10b are disposed to be separated from one another in the missing portion 9 can be illustrated.

Example

Tires of Examples 1 to 11 with tire sizes of 275/40R21 in which sound absorbing members having band-like shapes were bonded to inner surfaces of tread portions along tire circumferential directions, the sound absorbing members included missing portions at one location in the tire circumferential directions, the missing portions were disposed in ranges corresponding to light points in tire main bodies, correction bodies for correcting weight unbalance were fixed to tire inner surfaces in the missing portions within the ranges corresponding to the light points, and values of the relationship formula between the virtual weight Ws of the missing portion, the weight Wu of the correction body, and the static balance weight SB, and the ratios of the circumferential lengths C2 of the missing portions to the tire inner circumferential lengths C1 were differentiated as shown in Table 1 were fabricated.

For comparison, a tire of Conventional Example in which no sound absorbing member was bonded to an inner surface of a tread portion was prepared. Additionally, a tire of Comparative Example having a structure in which a missing portion was included in a range corresponding to a light point in a tire main body, but a correction body was not fixed to the missing portion was prepared.

A yield, noise performance, and the durability of the sound absorbing members of these test tires were evaluated by the following testing method, and Table 1 shows the results.

Yield:

100 of each of the test tires were manufactured, mounted on a wheel having a rim size of 21×9.5J, a load 80% of the maximum load at air pressure of 200 kPa was applied, and a traveling test was performed using a drum testing machine at a speed of 10 km/h. Specifically, a proportion (yield rate) compliant to standard values of uniformity and of dynamic balance was measured. Using the yield rate of each test tire, the evaluation results are expressed as index values with the yield rate of the tire of Conventional Example being assigned the value of 100. Larger index values mean an improvement in yield rate and excellent balance of the tire.

Noise Performance:

Each test tire was mounted on a wheel having a rim size of 21×9.5J, mounted on a test vehicle, and a sound pressure level of noise during traveling was measured with a microphone attached to a window on a driver seat side. Specifically, a sound pressure in a frequency band at from 150 Hz to 250 Hz in a ⅓ octave band waveform was measured. Using the measurement value of each test tire, the evaluation results are expressed as index values with the measurement value of Conventional Example being assigned the value of 100. Smaller index values mean greater effect of reducing cavity resonance and superior noise performance.

Durability of Sound Absorbing Member:

Each test tire was mounted on a wheel having a rim size of 21×9.5 J, and a traveling test was performed using a drum testing machine at a travel speed of 81 km/h, air pressure of 120 kPa, and a travel distance of 6480 km. After the testing, presence of damage or separation of the sound absorbing member was visually confirmed. The evaluation results show the presence of damage or separation of the sound absorbing member.

TABLE 1-1

|  | Conventional Example | Comparative Example | Example 1 | Example 2 | Example 3 | Example 4 |
|---|---|---|---|---|---|---|
| Presence of sound absorbing member | No | Yes | Yes | Yes | Yes | Yes |
| Presence of correction body | No | No | Yes | Yes | Yes | Yes |
| Value of relationship formula between virtual weight Ws of missing portion, weight Wu of correction body, and static balance weight SB Wu/(Ws + SB) | — | — | 0.4 | 0.5 | 0.8 | 1.0 |
| Ratio of circumferential length C2 of missing portion to tire inner circumferential length C1 (C2/C1 × 100%) | — | 4% | 4% | 4% | 4% | 4% |
| Yield | 100 | 85 | 95 | 100 | 105 | 110 |
| Noise performance | 100 | 85 | 85 | 85 | 85 | 85 |
| Durability of sound absorbing member (presence of damage or separation) | — | Yes | Yes | Yes | Yes | Yes |

TABLE 1-2

|  | Example 5 | Example 6 | Example 7 | Example 8 | Example 9 | Example 10 | Example 11 |
|---|---|---|---|---|---|---|---|
| Presence of sound absorbing member | Yes | Yes | Yes | Yes | Yes | Yes | Yes |
| Presence of correction body | Yes | Yes | Yes | Yes | Yes | Yes | Yes |
| Value of relationship formula between virtual weight Ws of missing portion, weight Wu of correction body, and static balance weight SB Wu/(Ws + SB) | 1.2 | 1.5 | 1.6 | 0.5 | 0.5 | 0.5 | 0.5 |
| Ratio of circumferential length C2 of missing portion to tire inner circumferential length C1 (C2/C1 × 100%) | 4% | 4% | 4% | 5% | 15% | 20% | 25% |
| Yield | 105 | 100 | 95 | 100 | 100 | 100 | 100 |
| Noise performance | 85 | 85 | 85 | 85 | 90 | 95 | 100 |
| Durability of sound absorbing member (presence of damage or separation) | Yes | Yes | Yes | No | No | No | No |

As can be seen from Table 1, the tires of Examples 1 to 11 have improved the yields compared with that of the Conventional Example. In particular, in Examples 8 to 10, the durability of the sound absorbing member was improved while noise performance was ensured. On the other hand, since the tire of the Comparative Example did not include the correction body in the missing portion, the degradation of the yield was significant.

The invention claimed is:

1. A pneumatic tire, comprising:
   a sound absorbing member having a band shape bonded to an inner surface of a tread portion along a tire circumferential direction;
   the sound absorbing member comprising a missing portion at at least one location in the tire circumferential direction,
   the at least one missing portion being disposed in a range corresponding to a light point in a tire main body, the light point being a position where the weight is the lightest on the circumference of the tire main body not including the sound absorbing member, and
   a correction body for correcting weight unbalance being fixed to a tire inner surface in the missing portion within the range corresponding to the light point, wherein
   the correction body is fixed to the tire inner surface via an adhesive layer,
   an adhesive strength of the adhesive layer is in a range of from 3.0 N/mm² to 100 N/mm²,
   a volume Vu of the correction body is in a range of from 0.2% to 7.0% to a virtual volume Vs of the missing portion, and
   a density of a weight Wu of the correction body to a virtual volume Vs of the missing portion is in a range of from 1.0 g/cm³ to 4.0 g/cm³.

2. The pneumatic tire according to claim 1, wherein a circumferential length of the missing portion is in a range of from 5% to 20% to a tire inner circumferential length.

3. The pneumatic tire according to claim 1, wherein an amount of silicon in a release agent detected in at least a fixed region of the correction body by a fluorescence X-ray analysis method is not greater than 10.0 wt. %.

4. The pneumatic tire according to claim 1, wherein a thickness of a release agent detected in at least a fixed region of the correction body by an electron microscope is not greater than 100 μm.

5. The pneumatic tire according to claim 1, wherein the adhesive layer is made of a cyanoacrylate-based adhesive.

6. The pneumatic tire according to claim 1, wherein the correction body is disposed closer to an inner side in a tire width direction than a ground contact edge.

7. The pneumatic tire according to claim 1, wherein the correction body is directly adhered to the tire inner surface.

8. The pneumatic tire according to claim 1, wherein a base is inserted between the correction body and the tire inner surface.

9. The pneumatic tire according to claim 1, wherein as a tire inner surface roughness in a fixed region of the correction body, an arithmetic mean height Sa is in a range of from 0.3 μm to 15.0 μm, and a maximum height Sz is in a range of from 2.5 μm to 60.0 μm.

10. The pneumatic tire according to claim 1, wherein the correction body is a sensor unit.

11. The pneumatic tire according to claim 1, wherein the correction body comprises a plurality of correction bodies for correcting weight unbalance fixed to the tire inner surface in the missing portion within the range corresponding to the light point.

12. The pneumatic tire according to claim 1, wherein, as a tire inner surface roughness in a fixed region of the correction body, an arithmetic mean height Sa is in a range of from 0.3 μm to 15.0 μm, and a maximum height Sz is in a range of from 31.0 μm to 60.0 μm.

13. A pneumatic tire, comprising:
a sound absorbing member having a band shape bonded to an inner surface of a tread portion along a tire circumferential direction;
the sound absorbing member comprising a missing portion at at least one location in the tire circumferential direction,
the at least one missing portion being disposed in a range corresponding to a light point in a tire main body, the light point being a position where the weight is the lightest on the circumference of the tire main body not including the sound absorbing member, and
a correction body for correcting weight unbalance being fixed to a tire inner surface in the missing portion within the range corresponding to the light point, wherein
the correction body is fixed to the tire inner surface via an adhesive layer,
an adhesive strength of the adhesive layer is in a range of from 3.0 N/mm$^2$ to 100 N/mm$^2$,
a volume Vu of the correction body is in a range of from 0.2% to 7.0% to a virtual volume Vs of the missing portion, and
the correction body is positioned offset from a circumferential direction center of the missing portion.

* * * * *